United States Patent Office 3,000,902
Patented Sept. 19, 1961

---

3,000,902
CROWEACIC ACID DERIVATIVES
Arthur F. Wagner, Princeton, and Frederick A. Kuehl, Jr., Rumson, N.J., assignors to Merck & Co., Inc., Rahway, N.J., a corporation of New Jersey
No Drawing. Filed Dec. 8, 1958, Ser. No. 778,597
1 Claim. (Cl. 260—340.5)

This invention relates to derivatives of croweacic acid and various isomers thereof. Croweacic acid, which has the chemical structure,

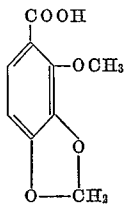

is a substituted trihydroxy benzoic acid which can be converted to a variety of useful organic compounds and in particular to compounds which have been shown to possess activity which is of the same type as that of mescaline as central nervous system depressants in frogs, fish and mammals. These compounds possess this mescalinic activity to a greater extent than mescaline. Mescalinic activity is known to produce symptoms of visual color hallucinations accompanied by bradycardia, dilation of the pupils, loss of accurate time sense, nausea, faintness and headache. Because of their greater activity as central nervous system depressants, however, such compounds may be particularly useful in the analysis of certain personality disorders.

The compounds of this invention, which are derivatives of croweacic acid or derivatives of an isomer of croweacic acid having the structure,

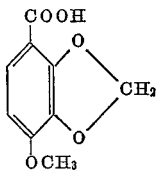

may be prepared from 1-methoxy-2,3-methylenedioxybenzene by means of a preparative scheme which involves the sequential steps of formylation, oxidation, nitration, reduction, diazotization, hydrolysis and alkylation. For example, 1-methoxy-2,3-methylenedioxybenzene can be converted to 6-methoxycroweacic acid by first converting the starting material to 2-methoxy-3,4-methylenedioxybenzaldehyde, thereafter oxidizing the aldehyde to the acid, nitrating the acid, whereby 2-methoxy-3,4-methylenedioxy-6-nitrobenzoic acid is obtained, esterifying the benzoic acid to protect the carboxyl group in the succeeding steps, then reducing the nitro group to the amino group, whereby an alkyl 6-amino-2-methoxy-3,4-methylenedioxybenzoate, for example, methyl 6-amino-2-methoxy-3,4-methylenedioxybenzoate is produced, diazotizing the amino compound and substituting the diazonium group with a hydroxyl group to form an alkyl 6-hydroxy-2-methoxy - 3,4 - methylenedioxybenzoate, for example, methyl 6-hydroxy-2-methoxy-3,4-methylenedioxybenzoate, and then alkylating the hydroxyl group to form the desired 6-alkoxy derivatives, such as the 2,6-dimethoxy-3,4-methylenedioxybenzoate, and finally hydrolyzing the ester to give the desired free acid, which is a 6-alkoxy-2-methoxy-3,4-methylenedioxybenzoic acid, for example, 2,6-dimethoxy-3,4-methylenedioxybenzoic acid. Various other 6-alkoxy derivatives may be prepared, such as the ethyl, propyl, butyl, pentyl, and hexyl derivatives. The acid isomeric with croweacic acid is prepared by and converted to the corresponding substituted acid by means of a similar series of reactions. In this case, the compounds finally obtained are the 6-alkoxy-4-methoxy-2,3-methylenedioxybenzoic acids, for example, 4,6-dimethoxy-2,3-methylenedioxybenzoic acid. Other 6-alkoxy derivatives may also be prepared in this manner.

The overall reaction scheme is exemplified by the following series of equations, wherein the left hand column shows the various steps involved in the croweacic acid series and the right hand column shows the various steps in the series involving an acid which is isomeric with croweacic acid:

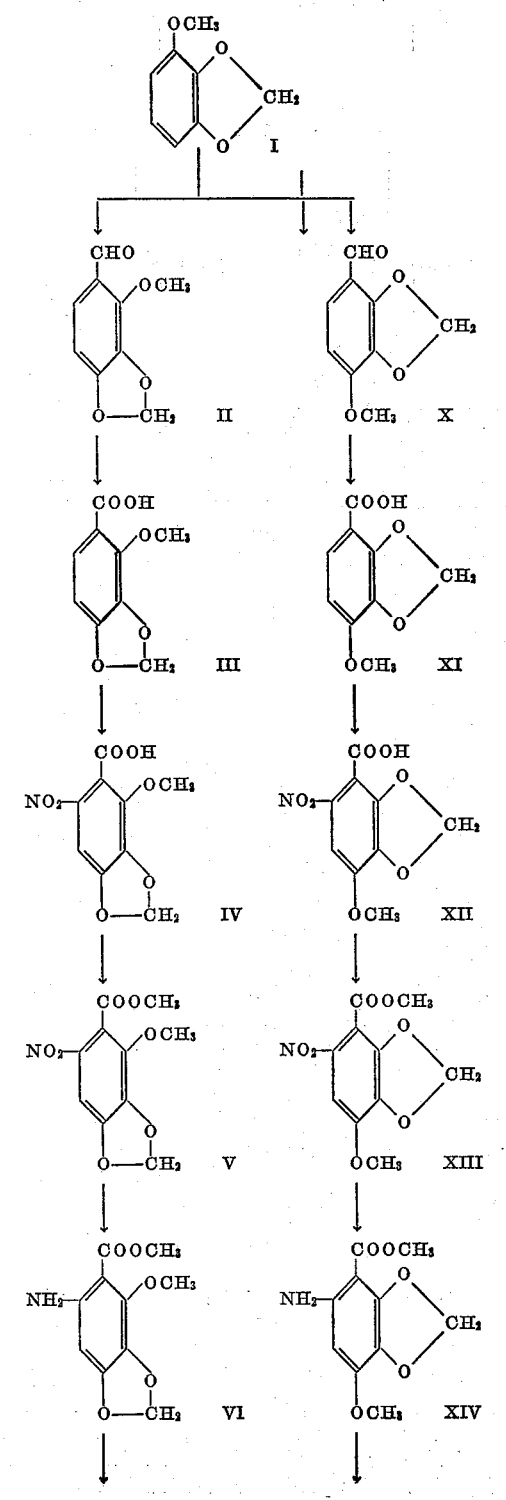

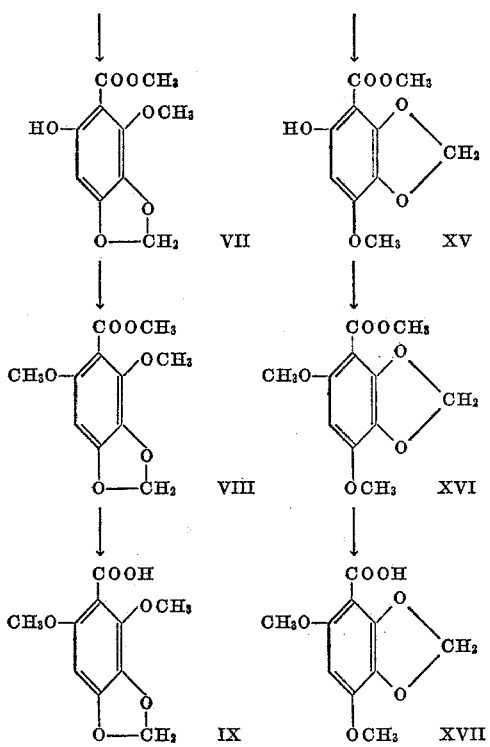

1-methoxy-2,3-methylenedioxybenzene can be formylated by treatment with an N-disubstituted formamide, such as dimethylformamide or N-methylformanilide in the presence of a Lewis acid catalyst, such as phosphorous exychloride or boron trifluoride. The complex formed in this reaction, can be hydrolyzed to give a mixture of the possible substituted benzaldehydes from which 2-methoxy-3,4-methylenedioxybenzaldehyde and 4-methoxy-2,3-methylenedioxybenzaldehyde can be isolated. These isomeric aldehydes can then be separated by various techniques, a preferred technique being the chromatographic separation of the aldehydes upon a column of a suitable adsorbent, such as alumina or Florisil elution of the adsorbent having the aldehydes adsorbed thereon may be readily accomplished by means of the use of suitable solvents, such as benzene and chloroform. The first fractions eluted contain 2-methoxy-3,4-methylendioxybenzaldehyde to the exclusion of the isomeric aldehydes. The later fractions yield 4-methoxy-2,3-methylenedioxybenzaldehyde to the virtual exclusion of the other isomers.

It is preferred that the aldehydes be separated at this point in order to facilitate the remaining steps in the synthesis. However, since the treatment of the various intermediate products may be the same for each of the isomeric aldehydes, it is anticipated that the subsequent conversions may be carried out upon a mixture of the aldehydes, if so desired. However, for purposes of convenience, and in order to specify more clearly the various preparative steps involved, the description of the synthesis will be confined to the steps involving the various reactions for converting 2-methoxy - 3,4 - methylenedioxybenzaldehyde to 2,6-dimethoxy-3,4-methylenedioxy-benzoic acid. The steps may be similarly carried out in the conversion of 4-methoxy-2,3-methylenedioxybenzaldehyde to 4,6-dimethoxy-2,3-methylenedioxybenzoic acid and other derivatives.

In this exemplification of the process, 2-methoxy-3,4-methylenedioxybenzaldehyde is converted to 2-methoxy-3,4-methylenedioxybenzoic acid by means of oxidation with a suitable oxidizing agent, such as silver oxide, potassium permanganate, air in an alkali such as sodium hydroxide or potassium hydroxide, chromic acid, manganese dioxide or a ferricyanide salt such as potassium ferricyanide. This particular reaction is advantageously carried out with silver oxide in the presence of a suitable solvent, such as ethanol, using a basic medium, for example, by the addition of a small amount of dilute sodium hydroxide or other base.

The nitration of the substituted benzoic acid to give 2-methoxy-3,4-methylenedioxy-6-nitrobenzoic acid (IV) is preferably carried out using cold concentrated nitric acid. If desired a mixture of nitric acid and acetic acid may be used. The product usually precipitates at this point, but further precipitation may be accomplished by adding water. The product is then isolated by filtration, purified by extraction with bicarbonate solution and reprecipitated.

The next step in the synthesis involves the esterification of the highly substituted benzoic acid. Although this esterification may be conventionally carried out by means of an acid catalyzed reaction with an alcohol, if desired, it is preferred to utilize a highly selective esterifying agent for this conversion. The use of diazomethane, for example, satisfactorily esterifies the substituted benzoic acid producing the methyl ester thereof. In carrying out this reaction, the diazomethane may be used in stoichiometric amounts but it is generally preferred to be used in excess. The excess is later decomposed with an acid, such as acetic acid. Other esters than the methyl ester, for example, the ethyl or propyl esters, may be prepared by suitable preparative procedures if desired and other esterifying agents may be used. The use of a dialkyl sulfite such as dimethyl sulfite or diethyl sulfite is another effective technique for esterification.

The benzoate thus prepared, for example, methyl 2-methoxy-3,4-methylenedioxy-6-nitrobenzoate, is then reduced to the corresponding amino compound by treatment with a suitable reducing agent. Any of a wide number of reducing agents may be utilized for this purpose. Catalytic reduction with hydrogen using a catalyst such as a noble metal catalyst, for example, platinum or palladium, on a suitable support, such as charcoal, has been found to be particularly effective. If desired, the amino derivative may be acylated to give, for example, methyl 6-acetamido - 2 - methoxy-3,4-methylenedioxybenzoate. Other reduction techniques include the use of stannous chloride, tin or zinc and hydrochloric acid, Raney nickel, and ferrous sulfate.

The diazotization of the amino derivative is then utilized to introduce the 6-hydroxy group. Methyl 6-amino-2-methoxy-3,4-methylenedioxybenzoate is diazotized by treatment with nitrous acid, for example, as formed by the reaction between sodium nitrite and dilute sulfuric acid, and the thus formed diazonium salt is then converted to the hydroxyl derivative by treatment with water, preferably in the form of steam, superheated steam, or in the presence of a salt which will raise the temperature of boiling water to permit rapid hydrolysis. Salts which may be used in the preferred procedure include sodium sulfate or cupric sulfate. For example, methyl 6-hydroxy-2-methoxy-3,4-methylenedioxybenzoate is obtained in this way as well as other esters.

Alkylation of the hydroxyl derivative with a reagent which will suitably alkylate the hydroxyl group, such as dimethyl sulfate, diethyl sulfate, methyl iodide or diazomethane, in the presence of a catalyst if desired, or other suitable alkylating agents produces the corresponding 6-alkoxy derivative, for example, methyl 2,6-dimethoxy-3,4-methylenedioxybenzoate. The final step in the synthesis is the hydrolysis of the ester. This hydrolysis may be suitably accomplished by means of a base, such as an alkali metal hydroxide or alkaline earth metal hydroxide, in the presence of an inert, water-miscible organic solvent, if desired. Methyl 2,6-dimethoxy-3,4-methylenedioxybenzoate, for example, may be converted to the desired 2,6-dimethoxy-3,4-methylenedioxybenzoic acid by treatment of the ester with aqueous methanolic sodium hydroxide.

While the synthesis has been described with some particularity with respect to the croweacic acid series of conversions, it is equally applicable to conversions involving the isomeric acid, 4-methoxy-2,3-methylenedioxybenzoic acid.

The process of this invention and the preparation of the various intermediates concerned will be more particularly understood by reference to the following examples, which are included for purposes of illustration only and are not to be construed as in any way limiting the scope of the instant invention which is described in the appended claims.

EXAMPLE 1

*2-methoxy-3,4-methylenedioxybenzaldehyde (II) and 4-methoxy-2,3-methylenedioxybenzaldehyde (X)*

25 g. of ice-cold dimethyl formamide was stirred while being treated dropwise with 50 g. of phosphorus oxychloride. When the addition was complete, the mixture was allowed to warm to room temperature over a period of 30 min. 24 g. of 1-methoxy-2,3-methylenedioxybenzene (I) was added and the mixture was stirred and heated at 100° C. for 2 hr. The reaction mixture was cooled, poured onto 400 g. of ice and after 15–30 min. extracted with four 100-ml. portions of chloroform. Concentration of the combined chloroform extracts gave a 24-g. residue of solids. The residue in 100 ml. of benzene was put on a 9 in. long column containing 800 g. of acid washed alumina and the product was eluted with 12 l. of benzene in 80 fractions. Elution was continued with 6 l. of chloroform in 50 additional fractions. Radial paper-grams of selected fractions, using the system water: n-butanol (200:1) showed ultraviolet fluorescent zones of $R_f$ 0.73±0.03. The fluorescent zones from fractions 3–10 were of a dull gray-blue color, those from fractions 40 to 130 were of a light blue color, while those from fractions 11–39 were intermediate in color. All the zones gave positive reactions when sprayed with 2,4-dinitrophenylhydrazine reagent. On the basis of the differing fluorescent colors, fractions 3–10 were combined and 4.6 g. of 2-methoxy-3,4-methylenedioxybenzaldehyde (II), M.P. 97–105° C. was obtained. Recrystallization of the product from ethanol gave the purified aldehyde (II), M.P. 103–105° C. Fractions 40–130 were combined and 10.7 g. of crude aldehyde (X) was obtained. Recrystallization of this product from 100 ml. of ethanol yielded 2.7 g. of 4-methoxy-2,3-methylenedioxybenzaldehyde (X), M.P. 85–86° C. Combination of fractions 11–39 gave 4.8 g. of a mixture of aldehydes (II) and (X).

EXAMPLE 2

*2-methoxy-3,4-methylenedioxybenzoic acid (croweacic acid) (III)*

A mixture of 1.12 g. of 2-methoxy-3,4-methylenedioxybenzaldehyde (II), 1.52 g. of freshly prepared silver oxide, 20 ml. of ethanol and 20 ml. of 5% sodium hydroxide was refluxed for 10 min. The mixture was filtered and the ethanol was removed under reduced pressure. After the alkaline solution was extracted with ether and acidified with hydrochloric acid, 1.02 g. of 2-methoxy-3,4-methylenedioxybenzoic acid (III), M.P. 159–160° C. was isolated by filtration.

EXAMPLE 3

*2-methoxy-3,4-methylenedioxy-6-nitrobenzoic acid (IV)*

680 mg. of 2-methoxy-3,4-methylenedioxybenzoic acid (III) was added in portions to 6 ml. of cold concentrated nitric acid. The reaction mixture was stirred about 10 min. and then diluted with 35 ml. of water. The product, isolated by filtration, was dissolved in ether and extracted with aqueous sodium bicarbonate solution. The bicarbonate extract was acidified to pH 3 and 500 mg. of the product, M.P. 185–192° C. was isolated by filtration. Recrystallization of the product from ethanol-water yielded 390 mg. of 2-methoxy-3,4-methylenedioxy-6-nitrobenzoic acid (IV), M.P. 190–192° C.

*Analysis.*—Calcd. for $C_9H_7NO_7$ (241.15): C, 44.82; H, 2.93; N, 5.81. Found: C, 44.92; H, 3.02; N, 5.68.

EXAMPLE 4

*Methyl 2-methoxy-3,4-methylenedioxy-6-nitrobenzoate (V)*

4 g. of 2-methoxy-3,4-methylenedioxy-6-nitrobenzoic acid (IV) was suspended in 100 ml. of ether and 850 mg. of diazomethane in 50 ml. of ether was added slowly. The excess diazomethane was decomposed with acetic acid and the ether solution was concentrated under reduced pressure. The product was taken up in chloroform and washed with aqueous sodium bicarbonate solution. The chloroform solution was dried over magnesium sulfate, filtered and concentrated under reduced pressure. Recrystallization of the residue from methanol yielded 3.6 g. of methyl 2-methoxy-3,4-methylenedioxy-6-nitrobenzoate (V), M.P. 115–117° C.

*Analysis.*—Calcd. for $C_{10}H_9NO_7$ (255.18): C, 47.06; H, 3.56; N, 5.49. Found: C, 47.34; H, 3.70; N, 5.28.

EXAMPLE 5

*Methyl 6-amino-2-methoxy-3,4-methylenedioxybenzoate (VI)*

A suspension of 1.5 g. of methyl 2-methoxy-3,4-methylenedioxy-6-nitrobenzoate (V) and 3 g. of 5% palladium on Darco charcoal in 80 ml. of methanol containing 1 g. of hydrogen chloride was shaken in an atmosphere of hydrogen at room temperature. The reaction mixture was filtered and the methanol solution was concentrated under reduced pressure. The residue was treated with aqueous sodium bicarbonate solution and the product, isolated by extraction with ether, was purified by vacuum sublimation at 120–130° C. Recrystallization of the purified product from benzene gave 300 mg. of methyl 6-amino-2-methoxy-3,4-methylenedioxybenzoate (VI), M.P. 86–88° C.

*Analysis.*—Calcd. for $C_{10}H_{11}NO_5$ (225.20): C, 53.33; H, 4.92; N, 6.22. Found: C, 53.41; H, 5.00; N, 6.86.

EXAMPLE 6

*Methyl 6-acetamido-2-methoxy-3,4-methylenedioxybenzoate*

A solution of 60 mg. of methyl 6-amino-2-methoxy-3,4-methylenedioxybenzoate (VI) in 1 ml. of pyridine was treated with 1 ml. of acetic anhydride at room temperature. After 12 hr. the solution was poured into ice water and acidified to pH 3. The product, isolated by extraction with ether, gave 34 mg. of material melting at 116–117° C. after recrystallization from methanol. Recrystallization of this material from methanol gave 20 mg. of methyl 6-acetamido-2-methoxy-3,4-methylenedioxybenzoate, M.P. 116–117° C.

*Analysis.*—Calcd. for $C_{12}H_{13}NO_6$ (267.23): C, 53.93; H, 4.90; N, 5.24. Found: C, 53.98; H, 4.95; N, 5.47.

EXAMPLE 7

*Methyl 6-hydroxy-2-methoxy-3,4-methylenedioxybenzoate (VII)*

A suspension of 441 mg. of methyl 6-amino-2-methoxy-3,4-methylenedioxybenzoate (VI) in 10 ml. of water was stirred and cooled while 2 ml. of 25% sulfuric acid was added. The solution was treated with 138 mg. of sodium nitrite in 2 ml. of water. After the excess nitrous acid was decomposed with urea, the solution was diluted to a 30-ml. volume with water and added dropwise through a jet of steam into a boiling solution of copper sulfate.

The reaction mixture was cooled and extracted with ether. The ether solution after being washed with aqueous sodium bicarbonate and concentrated under reduced pressure yielded 290 mg. of product. The product was purified by chromatography on alumina. Recrystallization of 60 mg. of this product from ethanol gave 30 mg. of methyl 6-hydroxy-2-methoxy-3,4-methylenedioxybenzoate (VII), M.P. 81–82° C. Sublimation of the product followed by recrystallization from methanol raised the melting point to 83–84° C.

*Analysis.*—Calcd. for $C_{10}H_{10}O_6$ (226.18): C, 53.10; H, 4.46. Found: C, 53.17; H, 4.49.

EXAMPLE 8

*2,6-dimethoxy-3,4-methylenedioxybenzoic acid (IX)*

A solution of 57 mg. of methyl 6-hydroxy-2-methoxy-3,4-methylenedioxybenzoate (VII) in 10 ml. of 2 N sodium hydroxide was stirred and treated with 1 ml. of dimethyl sulfate. After 15 min., 10 ml. of 2 N sodium hydroxide and 1 ml. of dimethyl sulfate were added. After 30 min. the alkaline solution was extracted with ether and the ether solution on concentration under reduced pressure yielded 59 mg. of methyl 2,6-dimethoxy-3,4-methylenedioxybenzoate (VIII).

42 milligrams of methyl 2,6-dimethoxy-3,4-methylenedioxybenzoate (VIII) was warmed on the steam bath with aqueous methanolic sodium hydroxide for 1 hr. The methanol was removed by concentration under reduced pressure and the solution was acidified to pH 3. The product was isolated by extraction with ether. After several recrystallizations of the product from ether-petroleum ether, 12 mg. of 2,6-dimethoxy-3,4-methylenedioxybenzoic acid (IX), M.P. 156–157° C., was obtained.

*Anaylsis.*—Calcd. for $C_{10}H_{10}O_6$ (226.18): C, 53.10; H, 4.46. Found: C, 53.22; H, 4.67.

EXAMPLE 9

*4-methoxy-2,3-methylenedioxybenzoic acid (XI)*

A mixture of 0.93 g. of 4-methoxy-2,3-methylenedioxybenzaldehyde (X), 1.26 g. of freshly prepared silver oxide, 18 ml. of ethanol and 18 ml. of 5% sodium hydroxide was refluxed for 15 min. The mixture was filtered and the ethanol was removed under reduced pressure. After the alkaline solution was extracted with ether and acidified with hydrochloric acid, 0.91 g. of 4-methoxy-2,3-methylenedioxybenzoic acid (XI), M.P. 250–255° C., was isolated by filtration.

EXAMPLE 10

*4-methoxy-2,3-methylenedioxy-6-nitrobenzoic acid (XII)*

0.9 gram of 4-methoxy-2,3-methylenedioxybenzoic acid (XI) was added in portions to 8 ml. of cold concentrated nitric acid. The reaction mixture was stirred for about 5 min. and then was diluted with 60 ml. of water. The product was isolated by filtration, washed with water, dried, and dissolved in chloroform. The chloroform solution was extracted with aqueous sodium bicarbonate. The bicarbonate extract was acidified and the product was collected by filtration. Recrystallization of this material from ethanol-water yielded 0.7 g. of 4-methoxy-2,3-methylenedioxy-6-nitrobenzoic acid (XII), M.P. 201–205° C. A second recrystallization from ethanol raised the melting point of the product to 203–205° C.

*Analysis.*—Calcd. for $C_9H_7O_7N$ (241.15): C, 44.82; H, 2.93; N, 5.81. Found: C, 44.96; H, 3.16; N, 6.05.

EXAMPLE 11

*Methyl 4-methoxy-2,3-methylenedioxy-6-nitrobenzoate (XIII)*

A solution of 102 mg. of diazomethane in 6 ml. of ether was added to a suspension of 500 mg. of 4-methoxy-2,3-methylenedioxy-6-nitrobenzoic acid (XII) in 20 ml. of ether. Excess diazomethane was decomposed with acetic acid and the ether solution was concentrated under reduced pressure. The residue was taken up in chloroform and the solution was washed with aqueous sodium bicarbonate solution. The chloroform solution was concentrated under reduced pressure. Recrystallization of the residue from methanol yielded 490 mg. of methyl 4-methoxy-2,3-methylenedioxy-6-nitrobenzoate (XIII), M.P. 145–147° C.

*Analysis.*—Calcd. for $C_{10}H_9NO_7$ (255.18): C, 47.06; H, 3.56; N, 5.49. Found: C, 47.12; H, 3.36; N, 5.55.

EXAMPLE 12

*Methyl 6-amino-4-methoxy-2,3-methylenedioxybenzoate (XIV)*

A suspension of 490 mg. of methyl 4-methoxy-2,3-methylenedioxy-6-nitrobenzoate (XIII) and 1 g. of 5% palladium on Darco charcoal in 25 ml. of methanol and 1 ml. of concentrated hydrochloric acid was shaken in an atmosphere of hydrogen at room temperature. The reaction mixture was warmed and filtered and the methanol solution was concentrated at reduced pressure. The residue was treated with aqueous sodium bicarbonate solution and the product was isolated by extraction with ether. Recrystallization of the product from benzene gave 210 mg. of methyl 6-amino-4-methoxy-2,3-methylenedioxybenzoate (XIV), M.P. 164–166° C.

*Analysis.*—Calcd. for $C_{10}H_{11}NO_5$ (225.20): C, 53.33; H, 4.92; N, 6.22. Found: C, 53.36; H, 4.75; N, 6.76.

EXAMPLE 13

*Methyl 6-acetamido-4-methoxy-2,3-methylenedioxybenzoate*

A solution of 100 mg. of methyl 6-amino-4-methoxy-2,3-methylenedioxybenzoate (XIV) in 2 ml. of pyridine was treated with 1 ml. of acetic anhydride at room temperature. After 12 hr. the mixture was poured into water and acidified to pH 3. The product was isolated by extraction with chloroform. The product was recrystallized from benzene-petroleum ether. A second crystallization of the product from ethanol yielded 40 mg. of methyl 6-acetamido-4-methoxy-2,3-methylenedioxybenzoate, M.P. 203–204° C.

*Analysis.*—Calcd. for $C_{12}H_{13}NO_6$ (267.23): C, 53.93; H, 4.90; N, 5.24. Found: C, 54.22; H, 4.71; N, 5.45.

EXAMPLE 14

*Methyl 6-hydroxy-4-methoxy-2,3-methylenedioxybenzoate (XIV)*

A suspension of 278 mg. of methyl 6-amino-4-methoxy-2,3-methylenedioxybenzoate (XIV) in 9 ml. of water was stirred and cooled while 1 ml. of 25% sulfuric acid was added. Then a solution of 98% mg. of sodium nitrite in 1 ml. of water was added dropwise. After the excess nitrous acid was decomposed with urea, the solution was diluted to a 30 ml. volume with water and added dropwise through a jet of stream into a boiling solution of copper sulfate.

The reaction mixture was cooled and extracted with ether. The ether solution, after being washed with aqueous sodium bicarbonate and concentrated under reduced pressure, gave 215 mg. of product. The product was purified by chromatography on alumina. Recrystallization of 50 mg. of this product from ethanol gave 32 mg. of methyl 6-hydroxy-4-methoxy-2,3-methylenedioxybenzoate (XV), M.P. 176–177° C.

*Analysis.*—Calcd. for $C_{10}H_{10}O_6$ (226.18): C, 53.10; H, 4.46. Found: C, 53.31; H, 4.36.

Various changes and modifications of the invention can be made, and to the extent that such variations incorporate the spirit of the instant invention, they are intended to be included within the scope of the appended claim.

What is claimed is:

A process which comprises (1) treating 1-methoxy-2,3-methylenedioxybenzene with an N-disubstituted formamide in the presence of a Lewis acid catalyst, (2) hydrolyzing the addition product thereby obtained to produce 2-methoxy-3,4-methylenedioxy-benzaldehyde, (3) oxidizing this product to produce 2-methoxy-3,4-methylenedioxy benzoic acid and, (4) nitrating this product to produce 2-methoxy-3,4-methylenedioxy-6-nitrobenzoic acid, (5) esterifying this product to produce the corresponding benzoate, (6) reducing the benzoate to produce an alkyl 6-amino-3,4-methylenedioxybenzoate, (7) diazotizing this product, (8) hydrolyzing the thus formed diazonium salt to produce an alkyl 6-hydroxy-2-methoxy-3,4-methylenedioxybenzoate, (9) methylating this product to produce an alkyl 2,6-dimethoxy-3,4-methylenedioxybenzoate and (10) hydrolyzing this product to produce 2,6-dimethoxy-3,4-methylenedioxybenzoic acid.

References Cited in the file of this patent

Baker et al.: "J. Chem. Soc.," pp. 1602–08 (1938).

Lowy et al.: "An Introduction to Organic Chemistry," 7th ed., pp. 87, 290, 272–73, 282, 393, New York, John Wiley & Sons, Inc. (1951).

Blair et al.: "J. Chem. Soc.," pp. 1836–9 (1954).

Buu-Hoi et al.: "Bull. Soc. Chim. France," vol. 22, pp. 1594–1597 (1955).